United States Patent
Schade et al.

[11] Patent Number: 5,962,613
[45] Date of Patent: Oct. 5, 1999

[54] WATER SOLUBLE CROSSLINKED COPOLYMERS, THEIR PREPARATION AND THEIR USE

[75] Inventors: Christian Schade, Ludwigshafen; Jürgen Detering, Limburgerhof; Stefan Stein, Saulheim; Dieter Boeckh, Limburgerhof; Hans-Ulrich Jäger, Neustadt, all of Germany

[73] Assignee: BASF Aktiengesellschaft, Ludwigshafen, Germany

[21] Appl. No.: 08/952,114

[22] PCT Filed: May 21, 1996

[86] PCT No.: PCT/EP96/02179

§ 371 Date: Nov. 24, 1997

§ 102(e) Date: Nov. 24, 1997

[87] PCT Pub. No.: WO96/37525

PCT Pub. Date: Nov. 28, 1996

[30] Foreign Application Priority Data

May 26, 1995 [DE] Germany .......................... 195 19 339

[51] Int. Cl.⁶ .......................... C08F 226/06; C08F 220/54
[52] U.S. Cl. .......................... 526/258; 526/307.1
[58] Field of Search .................. 526/258, 307.1

[56] References Cited

U.S. PATENT DOCUMENTS

| | | | |
|---|---|---|---|
| 5,094,867 | 3/1992 | Detering et al. | 426/271 |
| 5,308,532 | 5/1994 | Adler et al. | 252/174.23 |
| 5,635,169 | 6/1997 | Blankenburg et al. | 526/258 |

FOREIGN PATENT DOCUMENTS

| | | |
|---|---|---|
| 0 709 411 | 5/1996 | European Pat. Off. . |
| 32 09 224 | 9/1983 | Germany . |
| 40 00 978 | 7/1991 | Germany . |
| 43 41 072 | 6/1995 | Germany . |

*Primary Examiner*—Bernard Lipman
*Assistant Examiner*—Wu C. Cheng

*Attorney, Agent, or Firm*—Oblon, Spivak, McClelland, Maier & Neustadt, P.C.

[57] ABSTRACT

Water-soluble copolymers which are obtainable by free-radical solution polymerization of a) 10–99.5% by weight of at least one vinylimidazole of the formula

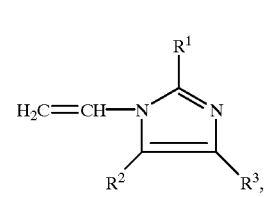

(I)

where $R^1$, $R^2$ and $R^3$ are identical or different and are H, $C_1$–$C_4$-alkyl, monomers of the formula

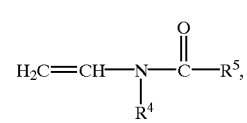

(II)

where $R^4$ and $R^5$ are identical or different and are H, $C_1$–$C_4$-alkyl or together form a ring of 3 to 5 methylene groups,
N-vinyloxazolidone, N-vinyltriazole, 4-vinylpyridine N-oxide or mixtures of said monomers, b) 0–89.5% by weight of other copolymerizable monoethylenically unsaturated monomers and c) 0.5–30% by weight of at least one monomer which acts as crosslinker and has at least two non-conjugated ethylenic double bonds in water and/or polar organic solvents in the presence of polymerization regulators, using from 0.1 to 5 parts by weight of polymerization regulator per 1 part by weight of crosslinker, a process for preparing the copolymers by free-radical solution polymerization of the monomers in the presence of polymerization regulators and the use of the copolymers as additive to detergents.

6 Claims, No Drawings

WATER SOLUBLE CROSSLINKED COPOLYMERS, THEIR PREPARATION AND THEIR USE

BACKGROUND OF THE INVENTION

1. Field of the Invention

The invention relates to water-soluble crosslinked copolymers, to a process for preparing the copolymers by free-radical polymerization of vinylimidazoles, N-vinylamides, N-vinyloxazolidone, N-vinyltriazole or mixtures of said monomers, with at least one monomer which acts as crosslinker and has at least 2 non-conjugated ethylenic double bonds in the presence of polymerization regulators, and the use of the copolymers as additive to detergents and cleaners.

2. Description of the Background

DE-A 32 09 224 discloses the preparation of insoluble polymers of low swellability from basic vinylheterocycles and their copolymers with up to 30% by weight of copolymerizable monomers and 0.1–10% by weight of crosslinkers in aqueous medium in the absence of initiators. As is evident from the comparative example in this publication, the polymerization of 100 parts by weight of N-vinylimidazole and 2 parts by weight of N,N'-methylenebisacrylamide in aqueous solution using azoisobutyronitrile as polymerization initiator results in firm gels.

The copolymerization of vinylheterocycles with crosslinkers in aqueous solution in the presence of free-radical initiators always results in gel formation, see the comparative example in DE-A 40 00 978. As is also evident from this reference, polymerization of a vinylheterocycle with a crosslinker and with exclusion of oxygen and of polymerization initiators results in water-insoluble copolymers which can be used, for example, to remove heavy metal ions from wine.

SUMMARY OF THE INVENTION

It is an object of the present invention to provide water-soluble polymers based on vinylheterocycles or vinylamides.

We have found that this object is achieved by water-soluble crosslinked copolymers which are obtainable by free-radical solution polymerization of a) 10–99.5% by weight of at least one vinylimidazole of the formula

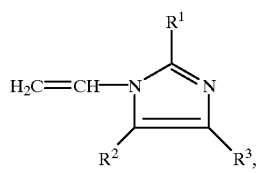

where $R^1$, $R^2$ and $R^3$ are identical or different and are H, $C_1$–$C_4$-alkyl, monomers of the formula

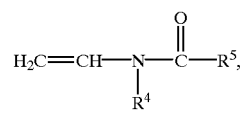

where $R^4$ and $R^5$ are identical or different and are H, $C_1$–$C_4$-alkyl or together form a ring of 3 to 5 methylene groups, N-vinyloxazolidone, N-vinyltriazole, 4-vinylpyridine N-oxide or mixtures of said monomers, b) 0–89.5% by weight of other copolymerizable monoethylenically unsaturated monomers and c) 0.5–30% by weight of at least one monomer which acts as crosslinker and has at least two non-conjugated ethylenic double bonds in water and/or polar organic solvents in the presence of polymerization regulators, using from 0.1 to 5 parts by weight of polymerization regulator per 1 part by weight of crosslinker.

The invention also relates to a process for preparing the water-soluble copolymers, which comprises subjecting a) 10–99.5% by weight of at least one vinylimidazole of the formula

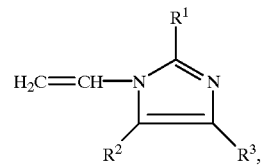

where $R^1$, $R^2$ and $R^3$ are identical or different and are H, $C_1$–$C_4$-alkyl, monomers of the formula

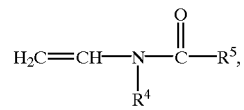

where $R^4$ and $R^5$ are identical or different and are H, $C_1$–$C_4$-alkyl or together form a ring of 3 to 5 methylene groups, N-vinyloxazolidone, N-vinyltriazole, 4-vinylpyridine N-oxide or mixtures of said monomers, b) 0–89.5% by weight of other copolymerizable monoethylenically unsaturated monomers and c) 0.5–30% by weight of at least one monomer which acts as crosslinker and has at least two non-conjugated ethylenic double bonds to a solution polymerization in water and/or polar organic solvents in the presence of polymerization regulators, using from 0.1 to 5 parts by weight of polymerization regulator per 1 part by weight of crosslinker.

The water-soluble copolymers prepared in this way are used as additive to detergents and cleaners.

DETAILED DESCRIPTION OF THE INVENTION

The copolymers according to the invention preferably contain as monomers of group (a) water-soluble heterocyclic monomers of the formula

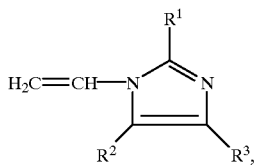

(I)

where $R^1$, $R^2$ and $R^3$ are identical or different and are H, $C_1$–$C_4$-alkyl. The substituents $R^1$, $R^2$ and $R^3$ are preferably H, $CH_3$ and $C_2H_5$.

Examples of monomers of group (a) are 1-vinylimidazole, 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 5-methyl-1-vinylimidazole, 4-ethyl-1-vinylimidazole, 4,5-dimethyl-1-vinylimidazole or 2,4,5-triethyl-1-vinylimidazole. It is also possible to use mixtures of said monomers in any desired ratios. The monomer group (a) which is preferably used is 2-methyl-1-vinylimidazole, 2-ethyl-1-vinylimidazole, 2-ethyl-4-methyl-1-vinylimidazole, 4-methyl-1-vinylimidazole or 1-vinylimidazole. 1-Vinylimidazole and 2-methyl-1-vinylimidazole are very particularly preferred.

Also suitable as monomers of group (a) are compounds of the formula

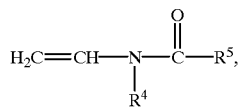

(II)

The substituents $R^4$ and $R^5$ are H, $C_1$–$C_4$-alkyl. They may also together form a ring of 3 to 5 methylene groups. Examples of compounds of formula II are N-vinylformamide, N-vinylacetamide, N-methyl-N-vinylacetamide, N-vinylpyrrolidone, N-vinylpiperidone or N-vinylcaprolactam. N-vinylpyrrolidone is particularly preferred among the compounds of the formula II. Further suitable compounds of group (a) are N-vinyloxazolidone, N-vinyltriazole and 4-vinylpyridine N-oxide. It is, of course, also possible to use mixtures of said monomers in the copolymerization. Monomers of group (a) which are preferably used are 1-vinylimidazole, 1-vinyl-2-methylimidazole, N-vinylpyrrolidone and mixtures of said monomers. The copolymers according to the invention contain the monomers in group (a) in an amount of at least 10% by weight, normally from 20 to 99.5, and preferably from 50 to 99, % by weight. The copolymers preferred for most practical applications are those which contain from 85 to 98% by weight of monomers (a) as copolymerized units.

The copolymers according to the invention may contain other copolymerizable monoethylenically unsaturated monomers. Examples of such monomers, which can be used singly or mixed with one another in the copolymerization, are (meth)acrylates such as methyl, ethyl, hydroxyethyl, propyl, hydroxypropyl, butyl, ethylhexyl, decyl, lauryl, isobornyl, cetyl, palmityl, phenoxyethyl or stearyl acrylate or the corresponding methacrylates, (meth)acrylamides such as acrylamide, N-methylolacrylamide, N-tert-butylacrylamide, N-tert-octylacrylamide, N-undecylacrylamide or the corresponding methacrylamides, vinyl esters having from 2 to 30, in particular 2 to 14, carbon atoms in the molecule, such as vinyl acetate, vinyl propionate, vinyl laurate, vinyl neooctanoate, vinyl neononanoate, vinyl neodecanoate, styrene, vinyltoluene, α-methylstyrene, unsaturated carboxylic acids such as acrylic acid, methacrylic acid, crotonic acid, maleic acid, fumaric acid, itaconic acid or their anhydrides, and 2-acrylamido-2-methylpropanesulfonic acid.

(Meth)acrylates are likewise suitable as monomers (b) when they are derived from amino alcohols. These monomers contain a basic nitrogen atom. They are used either in the form of the free bases or in neutralized or quaternized form. Further preferred monomers are those which contain a basic nitrogen atom and an amide group in the molecule. Examples of said suitable and preferred monomers are N,N-dialkylaminoalkyl (meth)acrylates, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate. Basic monomers which additionally contain an amide group in the molecule are N,N-dialkylaminoalkyl(meth)acrylamides, for example N,N-di-$C_1$–$C_3$-alkylamino-$C_2$–$C_6$-alkyl(meth)acrylamides such as dimethylaminoethylacrylamide, dimethylaminoethylmethacrylamide, diethylaminoethylacrylamide, diethylaminoethylmethacrylamide, dimethylaminopropylacrylamide and dimethylaminopropylmethacrylamide.

Further monomers which have a basic nitrogen atom are 4-vinylpyridine, 2-vinylpyridine, diallyldi($C_1$–$C_{12}$-alkyl) ammonium compounds and diallyl-$C_1$–$C_{12}$-alkylamines. The basic monomers are used in the copolymerization in the form of the free bases, of the salts with organic or inorganic acids or in quaternized form. Suitable for the quaternization are, for example, alkyl halides having from 1 to 18 carbon atoms in the alkyl group, for example methyl chloride, ethyl chloride or benzyl chloride. The quaternization of the nitrogen-containing basic monomers can also take place by reaction with dialkyl sulfates, especially with diethyl sulfate or dimethyl sulfate. Examples of quaternized monomers are trimethylammonioethyl methacrylate chloride, dimethylethylammonioethyl methacrylate ethyl sulfate and dimethylethylammonioethylmethacrylamide ethyl sulfate. Also suitable are 1-vinylimidazolium compounds which are, for example, quaternized with $C_1$–$C_{18}$-alkyl halides, dialkyl sulfates or benzyl chloride or converted into the salt form with an acid. Monomers of this type can be characterized, for example, by the general formula

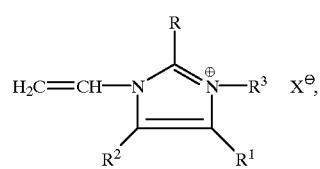

(III)

where
  R,$R^1$,$R^2$=H, $C_1$–$C_4$-alkyl or phenyl,
  $R^3$=H, $C_1$–$C_{18}$-alkyl or benzyl and
  $X^-$ is an anion.

The anion in formula III can be a halogen ion, an alkyl sulfate anion or else the residue of an inorganic or organic acid. Examples of quaternized 1-vinylimidazoles of the formula III are 3-methyl-1-vinylimidazolium chloride, 3-benzyl-1-vinylimidazolium chloride or 3-ethyl-1-vinylimidazolium methyl sulfate. It is, of course, also possible for the polymers which contain 1-vinylimidazoles of the formula I to be partly quaternized by reaction with conventional quaternizing agents such as dimethyl sulfate or methyl chloride.

Compounds preferred as monomers of group (b) are those which have a solubility of more than 5% by weight in water at 25° C. If the copolymers contain monomers of group (b), they can be present therein in amounts of up to 89.5, preferably up to 49.5, % of the weight of the polymer.

A crosslinker is always polymerized into the copolymers. Crosslinkers are compounds having at least 2 non-conjugated ethylenic double bonds in the molecule.

Examples of suitable crosslinkers are acrylates, methacrylates, allyl ethers or vinyl ethers of at least dihydric alcohols. The OH groups of the underlying alcohols can, moreover, be wholly or partly etherified or esterified: however, the crosslinkers contain at least two ethylenically unsaturated groups. Examples of underlying alcohols are dihydric alcohols such as 1,2-ethanediol, 1,2-propanediol, 1,3-propanediol, 1,2-butanediol, 1,3-butanediol, 2,3-butanediol, 1,4-butanediol, 2-buten-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methyl-1,5-pentanediol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, neopentyl glycol mono-(hydroxypivalate), 2,2-bis(4-hydroxyphenyl)propane, 2,2-bis-[4-(2-hydroxypropyl)phenyl]propane, diethylene glycol, triethylene glycol, tetraethylene glycol, dipropylene glycol, tripropylene glycol, tetrapropylene glycol, 3-thia-1,5-pentanediol, and polyethylene glycols, polypropylene glycols and polytetrahydrofurans with molecular weights of in each case from 200 to 10 000. Apart from homopolymers of ethylene oxide or propylene oxide, it is also possible to use block copolymers of ethylene oxide or propylene oxide or copolymers which contain incorporated ethylene oxide and propylene oxide groups. Examples of underlying alcohols with more than two OH groups are trimethylolpropane, glycerol, pentaerythritol, 1,2,5-pentanetriol, 1,2,6-hexanetriol, triethoxycyanuric acid, sorbitan, sugars such as sucrose, glucose, mannose. It is, of course, also possible for the polyhydric alcohols to be used after reaction with ethylene oxide or propylene oxide as the corresponding ethoxylates or propoxylates. The polyhydric alcohols can also be initially converted into the corresponding glycidyl ethers by reaction with epichlorohydrin.

Further suitable crosslinkers are the vinyl esters or the esters of monohydric, unsaturated alcohols with ethylenically unsaturated $C_3$–$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. However, it is also possible to esterify the monohydric, unsaturated alcohols with polybasic carboxylic acids, for example malonic acid, tartaric acid, trimellitic acid, phthalic acid, terephthalic acid, citric acid or succinic acid.

Further suitable crosslinkers are esters of unsaturated carboxylic acids with the polyhydric alcohols described above, for example of oleic acid, crotonic acid, cinnamic acid or 10-undecenoic acid.

Also suitable are straight-chain or branched, linear or cyclic, aliphatic or aromatic hydrocarbons which have at least two double bonds, which must not be conjugated in the case of aliphatic hydrocarbons, eg. divinylbenzene, divinyltoluene, 1,7-octadiene, 1,9-decadiene, 4-vinyl-1-cyclohexene, trivinylcyclohexane or polybutadienes having molecular weights of 200–20 000. Also suitable as crosslinkers are the acrylamides and methacrylamides of at least difunctional amines. Examples of such amines are diaminomethane, 1,2-diaminoethane, 1,3-diaminopropane, 1,4-diaminobutane, 1,6-diaminohexane, 1,12-dodecanediamine, piperazine, diethylenetriamine or isophoronediamine. Also suitable are the amides of allylamine and unsaturated carboxylic acids such as acrylic acid, methacrylic acid, itaconic acid, maleic acid or at least dibasic carboxylic acids as described above.

Also suitable are N-vinyl compounds of urea derivatives, at least difunctional amides, cyanurates or urethanes, for example of urea, ethyleneurea, propyleneurea or tartaramide.

Further suitable crosslinkers are divinyldioxane, tetraallylsilane or tetravinylsilane. It is, of course, also possible to use mixtures of the abovementioned compounds.

The crosslinkers which are preferably used are those which are soluble in the monomer mixture. Examples of crosslinkers which are particularly preferably used are methylenebisacrylamide, di- and triallylamine, divinylimidazole, N,N'-divinylethyleneurea, products of the reaction of polyhydric alcohols with acrylic acid or methacrylic acid, methacrylates and acrylates of polyalkylene oxides or polyhydric alcohols which have been reacted with ethylene oxide and/or propylene oxide and/or epichlorohydrin. Very particularly preferred crosslinkers are methylenebisacrylamide, N,N'-divinylethyleneurea and acrylates of glycol, butanediol, trimethylolpropane or glycerol, or acrylates of glycol, butanediol, trimethylolpropane or glycerol which have been reacted with ethylene oxide and/or epichlorohydrin.

The crosslinkers are present in the copolymers in amounts of from 0.5 to 30, preferably 1 to 20, % by weight of the polymer. Most of the copolymers according to the invention prepared to date preferably contain from 2 to 15% by weight of the crosslinkers.

Monomers (a), with or without (b) and (c), are copolymerized in a solution polymerization in water and/or polar organic solvents. Examples of suitable polar organic solvents are water-miscible compounds such as tetrahydrofuran, N-methylpyrrolidone, dioxane, dimethyl sulfoxide, acetone, glycols such as ethylene glycol, propylene glycol, 1,4-butanediol, diethylene glycol, triethylene glycol, tetraethylene glycol, and block copolymers of ethylene oxide and propylene oxide, and etherified polyalkylene glycols which can be obtained, for example, by alkylation of alkylene glycols and polyalkylene glycols. Suitable examples are glycols or polyethylene glycols containing $C_1$–$C_4$-alkylene end groups. The etherification can take place at one end or both ends. Further suitable solvents are alcohols having 1 to 4 carbon atoms or acetone. It is possible either to use a single solvent or to carry out the copolymerization in the presence of solvent mixtures. Particularly preferred solvents are water, $C_1$–$C_3$-alcohols such as methanol, ethanol, isopropanol and n-propanol, and mixtures of said solvents. The solvents are normally used in an amount such that the copolymer content of the resulting solutions is from 5 to 80, preferably 10 to 60, % by weight.

The copolymerization takes place in the presence of polymerization regulators. Suitable polymerization regulators are described in detail, for example, by K. C. Berger and G. Brandrup in J. Brandrup, E. H. Immergut, Polymer Handbook, 3rd Edition, John Wiley & Sons, New York, 1989, pages II/81–II/141. Examples of polymerization regulators are halogen compounds such as tetrachloromethane, chloroform, bromotrichloromethane, bromoform, allyl compounds such as allyl alcohol or 2,5-diphenyl-1-hexene, aldehydes, formic acid, its salts or esters. Regulators which contain sulfur in bound form are preferably used.

Examples of compounds of this type are inorganic bisulfites, disulfites and dithionites or organic sulfides, disulfides, polysulfides, sulfoxides, sulfones and mercapto compounds. The following polymerization regulators are mentioned as examples: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, thiodiethanol, di-t-butyl trisulfide and dimethyl sulfoxide. Compounds which are preferably used as polymerization regulators are mercapto compounds, dialkyl sulfides, dialkyl disulfides and/or diaryl sulfides. Examples of these compounds are ethyl thioglycolate, cysteine, 2-mercaptoethanol, 3-mercaptopropanol, 3-mercapto-1,2-propanediol, 4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan.

Mercapto alcohols and/or mercapto carboxylic acids are preferably used as regulators in the copolymerization. In order to obtain water-soluble copolymers, from 0.1 to 5, preferably 0.2 to 2, in particular 0.25 to 1, parts by weight of a polymerization regulator are used per 1 part by weight of a crosslinker.

The monomers undergo free-radical copolymerization in a solution polymerization. The copolymerization is initiated by using the free-radical polymerization initiators customarily used in such processes.

Free-radical initiators are all conventional peroxy and azo compounds, for example peroxides, hydroperoxides and peroxy esters, such as hydrogen peroxide, dibenzoyl peroxide, di-tert-butyl peroxide, tert-butyl hydroperoxide, diacyl peroxides such as dilauroyl peroxide, didecanoyl peroxide and dioctanoyl peroxide, or peresters such as tert-butyl peroctanoate, tert-butyl perpivalate, tert-amyl perpivalate or tert-butyl perneodecanoate, and azo compounds such as 2,2'-azobis(2-amidinopropane) dihydrochloride, 2,2'-azobis[2-(2-imidazolin-2-yl)propane] dihydrochloride, 4,4'-azobis(4-cyanovaleric acid), 2,2'-azobis(2,4-dimethylvaleronitrile), 2,2'-azobisisobutyronitrile, 2,2'-azobis(2-methylbutyronitrile), dimethyl 2,2'-azobis (isobutyrate), 2,2'-azobis(4-methoxy-2,4-dimethylvaleronitrile), 1,1'-azobis(1-cyclohexanecarbonitrile), 2,2'-azobis(2,4,4-trimethylpentane) or 2-(carbamoylazo)isobutyronitrile. It is, of course, also possible to use mixtures of initiators or the known redox initiators. Examples of redox initiators are combinations of at least one peroxy compound such as potassium, sodium or ammonium persulfate, sodium hypochlorite, sodium perborate, sodium percarbonate, hydrogen peroxide, tert-butyl hydroperoxide or di-tert-butyl peroxide and at least one reducing agent such as ascorbic acid, lactic acid, citric acid, sodium sulfate, sodium bisulfite, acetone sulfite, sodium dithionite, sodium hydroxymethylsulfinate or a tertiary amine such as dimethylphenylamine. The initiators which are preferably used are those which have a solubility of more than 5% by weight in water, methanol, ethanol or isopropanol at 25° C. The initiators are used in the conventional amounts, for example from 0.1 to 5% of the weight of the monomers to be polymerized.

The copolymerization is carried out by conventional techniques of solution polymerization, eg. by batch polymerization in which monomers (a) and (c), with or without (b), polymerization regulator and initiator are introduced into a solvent and heated to the polymerization temperature. The reaction mixture is preferably stirred at the polymerization temperature until more than 99.9% of the monomers have reacted. It is also possible in this process for the polymerization initiators to be added only after the polymerization temperature has been reached.

Further variants of the process are feed methods, which are preferably used. These entail one or all reactants being added, wholly or partly, batchwise or continuously, together or in separate feeds, to a reaction mixture. Thus, for example, a solution of the polymerization regulator and an initiator solution can be added continuously or batchwise to a mixture of the monomers and a solvent at the polymerization temperature within a given time. However, it is also possible to meter a mixture of regulator and initiator into the initial mixture which has been heated to the polymerization temperature. Another variant comprises adding the initiator to the initial mixture below or at the polymerization temperature, and feeding the regulator or a solution of the regulator into the reaction mixture within a preset time only after the polymerization temperature has been reached. In another variant, the initiator and the crosslinker (c) are added to a mixture of regulator, monomers (a) with or without monomers (b) and a solvent after the polymerization temperature has been reached. It is also possible to heat the initial mixture to the polymerization temperature and then add the regulator, initiator and monomers (c) in separate feeds or together. It is, of course, also possible to add the regulator, initiator, monomers (c) and monomers (a) with or without monomers (b) to an initial mixture which has been heated to the polymerization temperature. Water or a mixture of water and at least part of monomers (a), with or without (b) and further components, is preferably used as initial mixture. A procedure in which the polymerization regulators are metered continuously or in portions into the monomers during the polymerization is particularly preferred.

The concentration of monomers in the reaction medium is normally from 10 to 60 and preferably from 20 to 45, % by weight. The polymerization is carried out in such a way that there is no visible gelling of the reaction mixture. If gelled particles are formed, they have a diameter of less than 1 mm, preferably less than 500 nm, determined by measurement of scattered light in the chosen reaction medium. The resulting copolymers form homogeneous solutions in the reaction medium. They have K values of from 10 to 300 (determined by the method of H. Fikentscher in aqueous solution at 25° C. with a polymer concentration of 1% by weight). The polymerizations are normally carried out at from 30 to 150, preferably from 50 to 120, °C.

The preparation of polymers which (formally) contain 4-vinylpyridine N-oxide as copolymerized unit is preferably carried out by copolymerization of 4-vinylpyridine followed by N-oxidation of the pyridine ring with, for example, peracetic acid prepared in situ.

The mixtures resulting in the polymerization can be subjected to physical or chemical treatment thereafter. Examples are the known processes for reducing residual monomers, such as addition of polymerization initiators or mixtures of a plurality of polymerization initiators at suitable temperatures or heating the polymerization solution to temperatures above the polymerization temperature, treatment of the polymer solution with steam or stripping with nitrogen or treatment of the reaction mixture with oxidizing or reducing reagents, adsorption processes such as adsorption of impurities on selected media such as active carbon or ultrafiltration. Conventional workup steps may also follow, for example suitable drying processes such as spray, freeze or drum drying, or agglomeration processes following the drying. The mixtures with low residual monomer contents obtained by the process according to the invention can also be marketed directly.

The copolymers are used, for example, as additive for pharmaceutical or cosmetic compositions, as adhesive additive, as additive in paper manufacture, for stabilizing enzymes or for adsorbing metal ions, dyes or acids. The particularly preferred use is as additive to detergents. The effect of copolymers in the washing of colored and white textiles is to inhibit color transfer to the uncolored textiles.

The crosslinked polymers of N-vinylimidazole and N-vinylpyrrolidone are particularly suitable for use in heavy-duty detergents because they are distinctly more effective than soluble polymers when the dye concentrations in the wash liquor are low. However, as a rule, the laundry washed in commercial washing is mainly white and slightly colored, plus laundry with very wash-resistant coloring. Laundry which releases dye to a high degree is, as a rule, present only inadvertently, and thus as a very small proportion, in the laundry, eg. if a colored sock is included in the wash. The crosslinked copolymers, which bind small amounts of dye distinctly more strongly than water-soluble color-transfer inhibitors, thus have a great advantage on use by comparison with the water-soluble products.

The detergents can be in powder form or in liquid formulation. The detergent and cleaner composition may vary widely. Detergent and cleaner formulations normally contain from 2 to 50% by weight of surfactants, with or without builders. These data apply both to liquid and to powder detergents. Detergent and cleaner formulations commonly used in Europe, the USA and Japan are tabulated, for example, in Chemical and Engn. News, 67 (1989) 35. Further details of the composition of detergents and cleaners are to be found in Ullmanns Enzyklopädie der technischen Chemie, Verlag Chemie, Weinheim 1983, 4th Edition, pages 63–160. The detergents may also contain a bleach, eg. sodium perborate or sodium percarbonate, which, when used, may be present in amounts of up to 30% by weight in the detergent formulation. The detergents or cleaners may contain further conventional additives, eg. complexing agents, opacifying agents, optical brighteners, enzymes, perfume oils, other color transfer inhibitors, antiredeposition agents, soil release polymers and/or bleach activators. They contain the copolymers according to the invention in amounts of from 0.1 to 10, preferably 0.2 to 3, % by weight.

The K values of the copolymers were determined by the method of H. Fikentscher, Cellulose-Chemie, 13 (1932) 58–64 and 71–74, in aqueous solution at 25° C. with a polymer concentration of 1% by weight. The percentage data in the examples are percentages by weight.

EXAMPLES

Example 1

400 ml of water, 50 g of N-vinylpyrrolidone and 50 g of vinylimidazole were heated while stirring with an anchor agitator at 200 rpm in a 1 l apparatus under a stream of nitrogen to 80° C. At this temperature, a first solution of 2 g of 2,2'-azobis(2-methylbutyronitrile) and 0.3 g of mercaptoethanol in 30 g of isopropanol and, in parallel, a second solution of 2 g of divinylethyleneurea in 30 ml of isopropanol were added over the course of 1.5 hours. The mixture was then stirred at this temperature for a further 3 hours. The isopropyl alcohol was subsequently removed from the mixture by steam distillation. The result was a clear polymer solution with little odor, a solids content of 18.6% and a K value of 23.3.

Example 2

400 ml of water and 100 g of N-vinylpyrrolidone were heated while stirring with an anchor agitator at 200 rpm in a 1 l apparatus under a stream of nitrogen to 80° C. At this temperature, a first solution of 2 g of 2,2'-azobis(2-methylbutyronitrile) and 2.5 g of mercaptoethanol in 30 g of isopropanol and, in parallel, a second solution of 8 g of N,N'-divinylethyleneurea in 70 ml of isopropanol were added over the course of 1.9 hours. The mixture was then stirred at this temperature for a further 2 hours. The isopropyl alcohol was subsequently removed from the mixture by steam distillation. The result was a clear colorless polymer solution with little odor, a solids content of 17.1% and a K value of 40.4. N-Vinylpyrrolidone was no longer detectable in the reaction mixture by gas chromatography.

Example 3

400 ml of water were heated while stirring with an anchor agitator at 200 rpm in a 1 l apparatus under a stream of nitrogen to 80° C. At this temperature, a first solution of 2 g of 2,2'-azobis(2-methylbutyronitrile) and 2 g of mercaptoethanol in 30 g of isopropanol and, in parallel, a second solution of 6 g of methylenebisacrylamide, 50 g of N-vinylpyrrolidone and 50 g of 1-vinylimidazole were added over the course of 2 hours. The mixture was then stirred at this temperature for a further 3.5 hours. The isopropyl alcohol was subsequently removed from the mixture by steam distillation. The result was a clear, pale yellow polymer solution with little odor, a solids content of 18.3% and a K value of 22.0.

Example 4

400 ml of water, 50 g of N-vinylpyrrolidone and 50 g of 1-vinylimidazole were heated while stirring with an anchor agitator at 200 rpm in a 1 l apparatus under a stream of nitrogen to 80° C. At this temperature, a first solution of 2 g of 2,2'-azobis(2-methylbutyronitrile) and 2 g of mercaptoethanol in 30 g of isopropanol and, in parallel, a second solution of 4 g of divinylethyleneurea in 30 ml of isopropanol were added over the course of 1.75 hours. The mixture was then stirred at this temperature for a further 3.5 hours. The isopropyl alcohol was subsequently removed from the mixture by steam distillation. The result was a pale yellow polymer solution with little odor, a solids content of 18.8% and a K value of 36.8.

Example 5

400 ml of water, 50 g of N-vinylpyrrolidone and 50 g of 1-vinylimidazole were heated while stirring with an anchor agitator at 200 rpm in a 1 l apparatus under a stream of nitrogen to 80° C. At this temperature, a first solution of 2 g of 2,2'-azobis(2-methylbutyronitrile) and 5 g of mercaptoethanol in 30 g of isopropanol and, in parallel, a second solution of 10 g of divinylethyleneurea in 70 ml of isopropanol were added over the course of 1.85 hours. The mixture was then stirred at this temperature for a further 3.5 hours. The isopropyl alcohol was subsequently removed from the mixture by steam distillation. The result was a clear polymer solution with little odor, a solids content of 21.5% and a K value of 24.9.

Determination of the molecular weight by small angle light scattering in 0.1 N NaCl solution produced a value of $M_W$=78 000. This was compared with a copolymer of N-vinylpyrrolidone and 1-vinylimidazole in the ratio 1:1 by weight, which had a K value of 24.4 and had been prepared without the addition of N,N'-divinylethyleneurea, which was found to have $M_W$=19 000. Comparison of the two values underlines the branched nature of the polymer according to the invention.

Example 6

400 ml of water and 100 g of 1-vinylimidazole were heated while stirring with an anchor agitator at 200 rpm in a 1 l apparatus under a stream of nitrogen to 80° C. At this temperature, a first solution of 2 g of 2,2'-azobis(2-amidinopropane) dihydrochloride and 5 g of mercaptoethanol in 30 g of water and, in parallel, a second solution of 8 g of triethylene glycol diacrylate in 50 ml of water were added over the course of 2 hours. The mixture was then stirred at this temperature for a further 3 hours and subsequently subjected to steam distillation. The result was a pale yellow polymer solution with little odor, a solids content of 18.9% and a K value of 21.4.

Example 7

400 ml of water, 50 g of vinylpyrrolidone and 50 g of 1-vinylimidazole were heated while stirring with an anchor agitator at 200 rpm in a 1 l apparatus under a stream of nitrogen to 80° C. At this temperature, a first solution of 1 g of 2,2'-azobis(2-methylbutyronitrile) and 1 g of mercaptoethanol in 30 g of isopropanol and, in parallel, a second solution of 2 g of divinylethyleneurea in 30 ml of isopropanol were added over the course of 1.5 hours. The mixture was then stirred at this temperature for a further 3 hours. The isopropanol was subsequently removed from the mixture by steam distillation. The result was a clear polymer solution with little odor, a solids content of 27.8% and a K value of 52.3.

Comparative Example 1

400 ml of water, 50 g of N-vinylpyrrolidone and 50 g of vinylimidazole were heated while stirring with an anchor agitator at 200 rpm in a 1 l apparatus under a stream of nitrogen to 80° C. At this temperature, a first solution of 2 g of 2,2'-azobis(2-methylbutyronitrile) and 30 g of isopropanol and, in parallel, a second solution of 2 g of N,N'-divinylethyleneurea in 30 ml of isopropanol were added over the course of 1.5 hours. 45 min after the start of the addition the mixture had completely gelled.

Comparative Example 2

400 ml of water, 50 g of N-vinylpyrrolidone and 50 g of vinylimidazole were heated while stirring with an anchor agitator at 200 rpm in a 1 l apparatus under a stream of nitrogen to 80° C. At this temperature, a first solution of 2 g of 2,2'-azobis(2-methylbutyronitrile) and 0.2 g of mercaptoethanol in 30 g of isopropanol and, in parallel, a second solution of 2.5 g of N,N'-divinylethyleneurea in 30 ml of isopropanol were added over the course of 1.5 hours. The mixture gels even during the additions.

Comparative Example 3

An experiment using 0.75 g of mercaptoethanol was carried out in the same way as Example 2. The result was an aqueous suspension of large gel particles.

Comparative Example 4

400 ml of water were heated while stirring with an anchor agitator at 200 rpm in a 1 l apparatus under a stream of nitrogen to 80° C. At this temperature, a first solution of 2 g of 2,2'-azobis(2-methylbutyronitrile) and 0.5 g of mercaptoethanol in 30 g of isopropanol and, in parallel, a second solution of 6 g of methylenebisacrylamide, 50 g of N-vinylpyrrolidone and 50 g of vinylimidazole were added over the course of 2 hours. Cloudy gel particles formed in the solution during the addition of the components. The final result was an aqueous suspension of large gel particles.

Examples of Use

Test Method

White cotton test fabric was washed under the conditions specified in Table 1 with addition of the detergent shown in Table 2 in the presence of dye. The dye was either released from cotton test dyeings during the washing process or added to the washing liquor as dye solution (see Table 1).

Table 1 contains the washing conditions for the examples. The composition of the detergents used is shown in Table 2. The coloring of the test fabric was measured by photometry. The strengths of each of the colorings were determined by the method described by A. Kud, Seifen, Öle, Fette, Wachse, 119 (1993) 590–594 from the individual reflectance measurements on the test fabrics. The inhibiting effect of the test substance on color transfer is determined in percent from the color strengths for the test with the particular test substance, the color strength for the test without test substance and the color strength of the test fabric before washing (the inhibition of color transfer is treated in the same way as the antiredeposition effect). Tables 3 and 4 shows the efficacies for the various dyes.

TABLE 1

| | Washing conditions | |
|---|---|---|
| | Test series 1 | Test series 2 |
| Machine | Launder-O-meter | |
| Cycles | 1 | |
| Duration | 30 min | |
| Temperature | 60° C. | |
| Water hardness | 3 mmol/l | |
| Dye introduction | solution | colored fabric |
| Test fabric | 2.5 g of cotton cheese cloth (bleached) | |
| Amount of liquor | 250 ml | |
| Detergent | detergent A | detergent B |
| Detergent concentration | 5.0 g/l | 4.5 g/l |

TABLE 2

Detergent compositions

| Ingredients | Detergent A [%] | Detergent B [%] |
|---|---|---|
| Linear Na $C_{10}/C_{13}$-alkylbenzenesulfonate (50% strength) | 7.0 | 8.6 |
| Na fatty alcohol sulfate | — | 2.7 |
| Adduct of 7 mol of ethylene oxide and 1 mol of $C_{13}/C_{15}$ oxo alcohol | 5.4 | — |
| Adduct of 10 mol of ethylene oxide and 1 mol of $C_{13}/C_{15}$ oxo alcohol | — | 6.3 |
| Zeolite A | 27.5 | 55 |
| Na citrate 5.5 $H_2O$ | — | 9.0 |
| Soap | 1.75 | — |
| Ingredients | Detergent A [%] | Detergent B [%] |
| Copolymer of 70% by weight acrylic acid and 30% by weight maleic acid, molecular weight 70 000 | 3.75 | 4.0 |
| Na carbonate | 15.0 | 6.0 |
| Na sulfate | 27.75 | 5.8 |
| Carboxymethylcellulose | 0.6 | 0.5 |
| Water | 8.85 | — |
| Test substance | 1.0 | 1.0 |

The polymers prepared in the examples were tested in washing series 1 and 2. The results are shown in Tables 3 and 4.

TABLE 3

Washing series 1 (test with dye solutions)

| | Direct blue 71 | Direct black 22 | Direct blue 218 | Direct orange 39 |
|---|---|---|---|---|
| Polymer 1 | 97.0% | 95.6% | 99.8% | 17.4% |
| Polymer 5 | 96.7% | 92.8% | 99.8% | 14.4% |
| Polymer 6 | 96.6% | 88.1% | 99.7% | 16.4% |
| Comparative Example 5 (polyvinylpyrrolidone with a K value of 30) | 95.6% | 79.4% | 25.9% | 1.5% |

TABLE 4

Washing series 2 (test with colored fabrics)

| | Direct blue 71 | Direct black 22 | Direct red 212 | Direct orange 39 |
|---|---|---|---|---|
| Polymer 8 (ZK228/36) | 61.2% | 83.4% | 67.8% | 40.7% |
| Comparative Example 6 (polyvinylpyrrolidone with a K value of 30) | 45.8% | 55.6% | 43.8% | 29.9% |
| Comparative Example 7 (1:1 vinylpyrrolidone/vinylimidazole copolymer, K value 18) | 53.5% | 66.5% | 67.7% | 37.9% |

The washing results in Table 3 show that the copolymers according to the invention are very effective inhibitors of color transfer and are distinctly superior to the color transfer inhibitor polyvinylpyrrolidone which is widely used in detergents. The table also shows that the improved effect occurs with many direct dyes and is not confined to a few representatives.

The washing results in Table 4 show that an excellent effect as color transfer inhibitor is also found in a test with colored fabrics which resembles conditions in practice. Once again, the effect is distinctly superior to that of known comparison polymers.

We claim:

1. A water-soluble crosslinked copolymer obtained by free-radical solution polymerization of a) at least one monomer selected from the group consisting of 10–99.5% by weight of at least one vinylimidazole of the formula

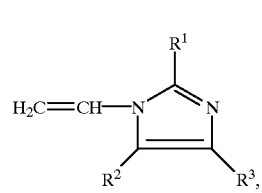

where $R^1$, $R^2$ and $R^3$ are identical or different and are H, $C_1$–$C_4$-alkyl, and a monomer of the formula

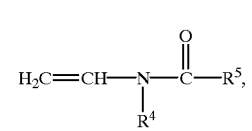

where $R^4$ and $R^5$ are identical or different and are H, $C_1$–$C_4$-alkyl or together form a ring of 3 to 5 methylene groups, N-vinyloxazolidne, N-vinyltriazole, 4-vinylpyridine N-oxide or mixtures of said monomers, b) 0–89.5% by weight of other copolymerizable monoethylenically unsaturated monomers and c) 0.5–30% by weight of at least one monomer which acts as crosslinker and has at least two non-conjugated ethylenic double bonds in water and/or polar organic solvents in the presence of polymerization regulators, using from 0.1 to 5 parts by weight of polymerization regulator per 1 part by weight of crosslinker and in the presence of a free radical initiator.

2. A water-soluble copolymer as claimed in claim 1, which contains 1-vinylimidazole and/or 1-vinylpyrrolidone as monomer of group (a).

3. A process for preparing a water-soluble copolymer as claimed in claim 1, which comprises subjecting a) 10–99.5% by weight of at least one vinylimidazole of the formula

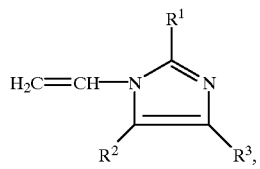

(I)

where $R^1$, $R^2$ and $R^3$ are identical or different and are H, $C_1$–$C_4$-alkyl, monomers of the formula

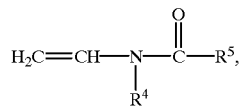

(II)

where $R^4$ and $R^5$ are identical or different and are H, $C_1$–$C_4$-alkyl or together form a ring of 3 to 5 methylene groups, N-vinyloxazolidone, N-vinyltriazole, 4-vinylpyridine N-oxide or mixtures of said monomers, b) 0–89.5% by weight of other copolymerizable monoethylenically unsaturated monomers and c) 0.5–30% by weight of at least one monomer which acts as crosslinker and has at least two non-conjugated ethylenic double bonds to a solution polymerization in water and/or polar organic solvents in the presence of polymerization regulators, using from 0.1 to 5 parts by weight of polymerization regulator per 1 part by weight of crosslinker.

4. A process as claimed in claim 3, wherein organic compounds which contain sulfur in bound form are used as polymerization regulators.

5. A cleaning composition, comprising a detergent and the water-soluble copolymer of claim 1.

6. A method of cleaning an article, comprising contacting the article with a composition comprising a detergent and the water-soluble copolymer of claim 1.

* * * * *